(12) United States Patent
Hamalainen et al.

(10) Patent No.: US 8,743,983 B2
(45) Date of Patent: Jun. 3, 2014

(54) BEARING DETERMINATION USING SIGNALS TRANSFORMED INTO FREQUENCY DOMAIN

(75) Inventors: Ari Henrik Hamalainen, Vantaa (FI); Antti Paavo Tapani Kainulainen, Espoo (FI); Ville Valtteri Ranki, Espoo (FI); Ilari Aleski Teikari, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/534,185

(22) Filed: Jun. 27, 2012

(65) Prior Publication Data

US 2012/0263259 A1    Oct. 18, 2012

Related U.S. Application Data

(62) Division of application No. 13/055,379, filed as application No. PCT/EP2008/059666 on Jul. 23, 2008.

(51) Int. Cl.
*H04K 1/10* (2006.01)
*H04L 27/28* (2006.01)

(52) U.S. Cl.
USPC .......................................... 375/260; 375/259

(58) Field of Classification Search
USPC .......................................................... 375/260
See application file for complete search history.

(56) References Cited

U.S. PATENT DOCUMENTS

| | | | |
|---|---|---|---|
| 6,791,388 B2 * | 9/2004 | Buchwald et al. | 327/248 |
| 7,058,002 B1 * | 6/2006 | Kumagai et al. | 370/203 |
| 8,184,523 B2 * | 5/2012 | Belotserkovsky et al. | 370/208 |
| 2009/0323865 A1 * | 12/2009 | Bradley et al. | 375/330 |
| 2010/0002789 A1 | 1/2010 | Karabinis | |

FOREIGN PATENT DOCUMENTS

EP    1471703 A    10/2004

OTHER PUBLICATIONS

Non-Final Office Action dated Oct. 2, 2012 of U.S. Appl. No. 13/055,379.

Yanxing Zeng et al., "Direct decoding of uplink space-time block coded multicarrier code division multiple access systems" Communications, 2004 IEEE International Conference on Paris, France Jun. 20-24, vol. 4, Jun. 20, 2004, pp. 2372-2376, XP010709687.

Jian Zuo et al., "Development of TVA SuperPDC: Phasor applications, tools, and event replay", Power and Energy Society General Meeting Conversion and Delivery of Electrical Energy in the 21st Century, 2008 IEEE, IEEE, Piscataway, NJ, USA, Jul. 20, 2008, pp. 1-8, XP031304064.

(Continued)

*Primary Examiner* — Erin File
(74) *Attorney, Agent, or Firm* — Banner & Witcoff, Ltd

(57) ABSTRACT

An apparatus, a method and a computer program for determining a bearing. The apparatus may comprise: a first transformer configured to transform a first signal formed from a set of multiple orthogonal subcarriers and received via a first path, from a time domain to a frequency domain and produce for each of a plurality of the multiple orthogonal subcarriers a respective first coefficient; a second transformer configured to transform a second signal formed from the set of multiple orthogonal subcarriers and received via a second path, different from the first path, from a time domain to a frequency domain and produce for each of a plurality of the multiple orthogonal subcarriers a respective second coefficient; and processing circuitry configured to process the plurality of first coefficients and the plurality of second coefficients to determine a bearing for the apparatus.

20 Claims, 3 Drawing Sheets

(56) References Cited

OTHER PUBLICATIONS

Lin et al., "Applying Direction Finding Algorithms for Obtaining Processing Gains in OFDM System with Multiple Receiving Antennas" 2003 IEEE, pp. 248-251.

Bossert et al., "Improved channel estimation with decision feedback for OFDM systems", Electronics Letters, May 28, 1998, vol. 34, No. 11, pp. 1064-1065.

Reede, "Ranging and Location for 802.22 WRANs", Oct. 10, 2006, doc.: IEEE 802.22-06/0206r0.

International Search Report for PCT/EP2008/059666 dated Aug. 4, 2009.

Final Office Action dated Apr. 4, 2013 in related U.S. Appl. No. 13/055,379.

\* cited by examiner

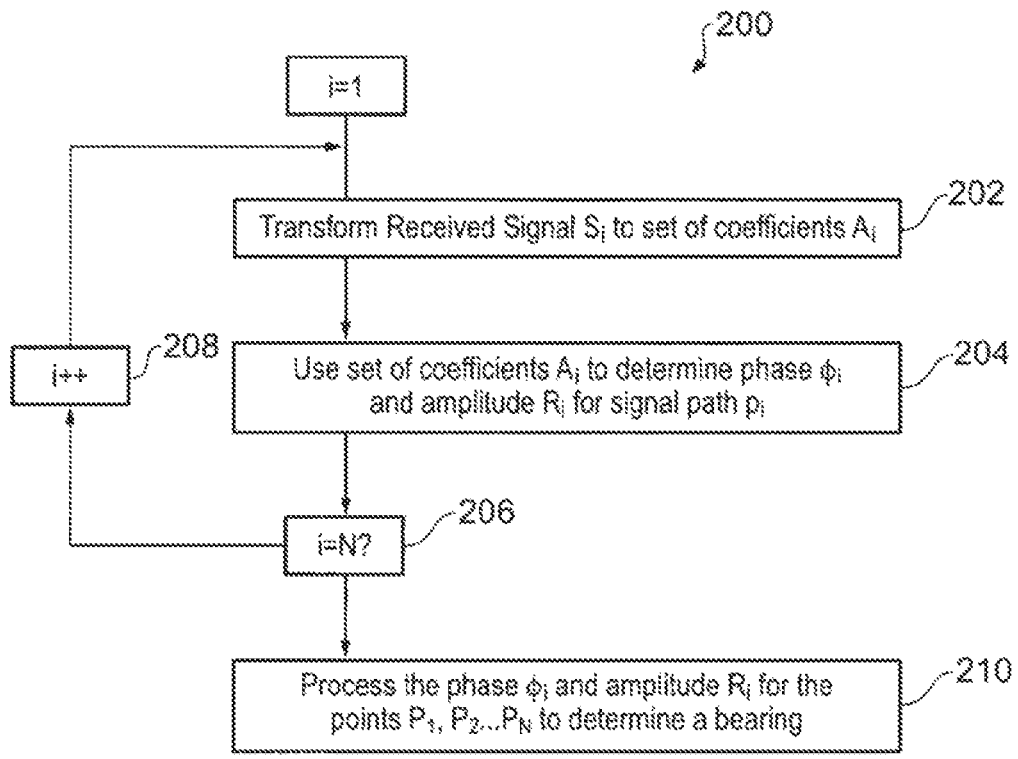
FIG. 5
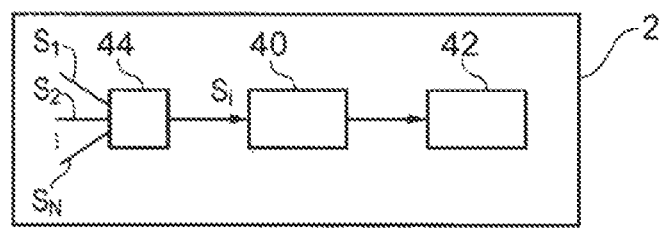
FIG. 6
FIG. 7

BEARING DETERMINATION USING SIGNALS TRANSFORMED INTO FREQUENCY DOMAIN

CROSS REFERENCE TO RELATED APPLICATION

This application is a divisional of and claims priority to co-pending application Ser. No. 13/055,379, filed Mar. 25, 2011, and having the same title, which application in its entirety is incorporated by reference herein.

FIELD OF THE INVENTION

Embodiments of the present invention relate to bearing determination. In particular, they relate to an apparatus, a method and a computer program for determining a bearing using orthogonal frequency division multiplexed (OFDM) signals.

BACKGROUND TO THE INVENTION

There are known techniques for determining a bearing using radio frequency (RF) signals. For example, an RF signal that is transmitted by a transmission apparatus may be received at an antenna arrangement that comprises multiple antennas. A bearing from the antenna arrangement to the transmitting apparatus may be determined, for example, by measuring the received signal strength intensity (RSSI) at each of the multiple antennas.

BRIEF DESCRIPTION OF VARIOUS EMBODIMENTS OF THE INVENTION

According to various, but not necessarily all, embodiments of the invention there is provided an apparatus comprising: at least a first transformer configured to transform a first signal formed from a set of multiple orthogonal subcarriers and received via a first path, from a time domain to a frequency domain and produce for each of a plurality of the multiple orthogonal subcarriers a respective first coefficient; and a second transformer configured to transform a second signal formed from the set of multiple orthogonal subcarriers and received via a second path, different from the first path, from a time domain to a frequency domain and produce for each of a plurality of the multiple orthogonal subcarriers a respective second coefficient; and comprising processing circuitry configured to process at least the plurality of first coefficients and the plurality of second coefficients to determine a bearing for the apparatus.

According to various, but not necessarily all, embodiments of the invention there is provided a method, comprising: transforming a first signal formed from a set of multiple orthogonal subcarriers and received via a first path, from a time domain to a frequency domain, to produce for each of a plurality of the multiple orthogonal subcarriers a respective first coefficient; transforming a second signal formed from the set of multiple orthogonal subcarriers and received via a second path, different from the first path, from a time domain to a frequency domain, to produce for each of a plurality of the multiple orthogonal subcarriers a respective second coefficient; and processing the plurality of first coefficients and the plurality of second coefficients to determine a bearing for the apparatus.

According to various, but not necessarily all, embodiments of the invention there is provided an apparatus, comprising: means for transforming a first signal formed from a set of multiple orthogonal subcarriers and received via a first path, from a time domain to a frequency domain to produce for each of a plurality of the multiple orthogonal subcarriers a respective first coefficient; means for transforming a second signal formed from the set of multiple orthogonal subcarriers and received via a second path, different from the first path, from a time domain to a frequency domain to produce for each of a plurality of the multiple orthogonal subcarriers a respective second coefficient; and means for processing the plurality of first coefficients and the plurality of second coefficients to determine a bearing for the apparatus.

According to various, but not necessarily all, embodiments of the invention there is provided an apparatus, comprising: a diversity antenna arrangement for receiving a signal comprising multiple orthogonal subcarriers from a transmitter and comprising a first antenna at a first position for receiving the signal via a first path and a second antenna at a second position for receiving the signal via a second path, different to the first path; a first transformer configured to transform the signal received by the first antenna from a time domain to a frequency domain and produce for each of a plurality of the multiple orthogonal subcarriers a respective first coefficient; a second transformer configured to transform the signal received by the second antenna from a time domain to a frequency domain and produce for each of a plurality of the multiple orthogonal subcarriers a respective second coefficient; and processing circuitry configured to process the plurality of first coefficients and the plurality of second coefficients to determine a bearing for the transmitter.

According to various, but not necessarily all, embodiments of the invention there is provided an apparatus, comprising: processing circuitry configured: to determine a plurality of phase values from one or more received signals, each of the determined phase values falling within a predetermined range defined by a maximum value and a minimum value, to apply a scaling factor to the determined phase values to produce scaled phase values falling within the range, to determine an average scaled phase value by averaging the scaled phase values, and to determine an average phase value for the plurality of phase values by applying the scaling factor to the average scaled phase value.

According to various, but not necessarily all, embodiments of the invention, there is provided a method, comprising: determining a plurality of phase values from one or more received signals, each of the determined phase values falling within a predetermined range defined by a maximum value and a minimum value; applying a scaling factor to the determined phase values to produce scaled phase values falling within the range; determining an average scaled phase value by averaging the scaled phase values; and determining an average phase value for the plurality of phase values by applying the scaling factor to the average scaled phase value.

BRIEF DESCRIPTION OF THE DRAWINGS

For a better understanding of various examples of embodiments of the present invention reference will now be made by way of example only to the accompanying drawings in which:

FIG. 5 illustrates a method of determining a bearing;
FIG. 6 illustrates one implementation of the apparatus;
and FIG. 7 illustrates a computer implementation of part or parts of the apparatus.

DETAILED DESCRIPTION OF VARIOUS EMBODIMENTS OF THE INVENTION

Figure 1:
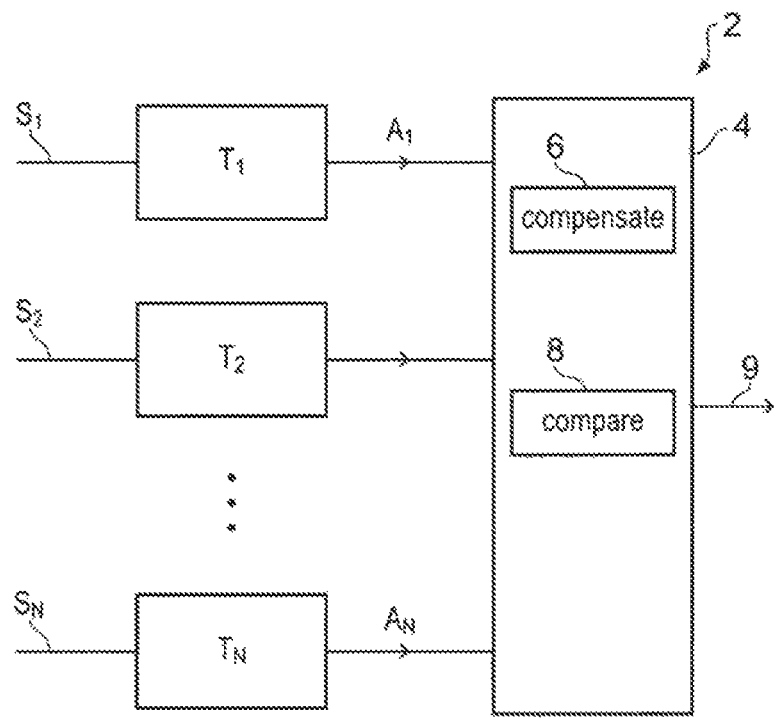
FIG. 1 illustrates a receiver apparatus.

FIG. 1 schematically illustrates an apparatus 2. The apparatus 2 is a receiver apparatus. Each of N received signals $s_i$ where i=1, 2 . . . N is input to a respective transformer $T_i$. N is equal to or greater than 2 or 3.

The respective transformers $T_i$ may, for example, be provided by different distinct hardware circuits arranged in parallel to operate simultaneously or may be provided by a single hardware circuit that is used in a time multiplexed manner so that it sequentially operates as each of the respective transformers $T_i$ in turn.

Each of the N input signals $s_i$ has travelled along a different signal path $p_i$ to arrive at the apparatus 2. A different path may result from having multiple receiver locations at the apparatus (receiver diversity) and/or may result from having multiple transmission locations for the received signals $s_i$ (transmitter diversity).

Figure 2:
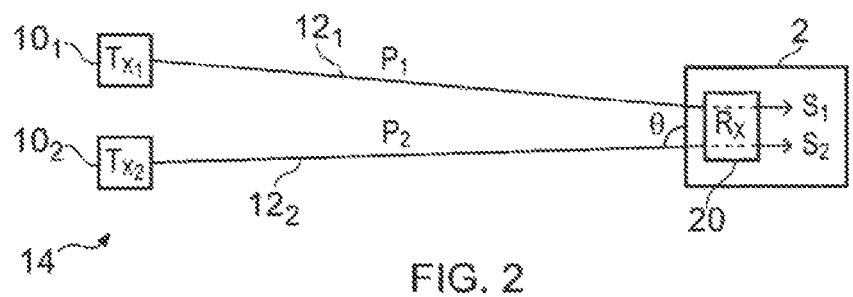
FIG. 2 illustrates transmitter diversity.

FIG. 2 illustrates a system 14 comprising the apparatus 2, a first transmission point $10_1$ for sending a first transmitted signal $12_1$ that is received as received signal $s_1$ by the apparatus 2 and a second transmission point $10_2$ for sending a second transmitted signal $12_2$ that is received as received signal $s_2$ by the apparatus 2. The first transmission point $10_1$ is at a different location to the second transmission point $10_2$ and transmitted signals $12_1$, $12_2$ are received as received signal $s_1$, $s_2$ at a single point by receiver circuitry comprising an antenna 20. Thus the received signal $s_1$ is received via a first signal path $p_1$ and the received signal $s_2$ is received via a second signal path $p_2$ that have different lengths. The difference in length between the signal paths depends upon the relative displacement of the first transmission point $10_1$ and the second transmission point $10_2$ and a bearing 8 of the apparatus 2. In this simplified two-dimensional figure, the bearing is reduced to a single angle. It should, however, be appreciated that in three dimensional use the bearing will comprise two angles.

Figure 3:
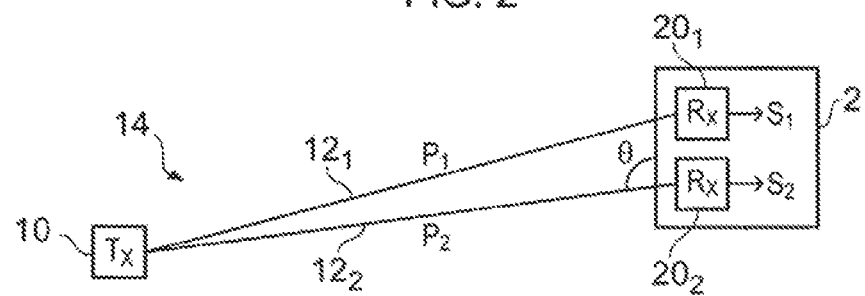
FIG. 3 illustrates receiver diversity.

FIG. 3 illustrates a system 14 comprising the apparatus 2 and a transmission point $10_1$ for sending a first transmitted signal $12_1$ that is received as received signal $s_1$ by the apparatus 2 and for sending a second transmitted signal $12_2$ that is received as received signal $s_2$ by the apparatus 2. The first transmitted signal $12_1$ and second transmitted signal $12_1$ may in different implementations be the same signal at a single point in time or the same signal at different points in time or different signals at the same time or different signals at different times. The apparatus 2, in this example, has a diversity antenna arrangement comprising multiple antennas at different positions. In this example, two antennas $20_1$, $20_2$ are illustrated but in other implementation more antennas may be used. A first antenna $20_1$ receives the signal $s_1$ via a first signal path $p_1$ and a second antenna $20_2$ receives the signal $s_2$ via a second signal path $p_2$ that has a different length to the first signal path $p_1$. The difference in length between the signal paths in this example depends upon the relative displacement of the first antenna $20_1$ and the second antenna $20_2$ and a bearing θ of the apparatus 2. In this simplified two-dimensional figure, the bearing is reduced to a single angle. It should, however, be appreciated that in normal three dimensional use more than two antennas are used which are not arranged in a straight line and the bearing will comprise two angles. The magnitude of the relative displacement of the first antenna $20_1$ and the second antenna $20_2$ is typically very small compared to the length of the signal paths.

Referring back to FIG. 1, a received signal $s_i$ can be represented as a weighted linear combination of a plurality of sub-carrier frequencies $\omega_j$, where j=1, 2 . . . M. Typically the received signals are orthogonal frequency division multiplexed (OFDM) signals For example, a received signal $s_i$ may be represented by:

$$s_i = \sum_{j=1}^{M} a_{ij} \exp(j\omega_j t)$$

where the frequencies $\omega_j$ are mutually orthogonal sub-carrier frequencies, and $a_{ij}$ is a complex weighting coefficient that modulates the frequency $\omega_j$ e.g. a received symbol.

The transmitted signal $12_i$ originally transmitted along signal path $p_i$ (which is received as signal $s_i$) may be represented as $$\sum_{j=1}^{M} b_{ij} \exp(j\omega_j t)$$

The complex weighting coefficient $a_{ij}$ may be modelled as a multiplication of the original transmitted coefficient $b_{ij}$ and a path-sensitive complex value $x_{ij}$. The path-sensitive complex value $x_{ij}$ can be represented as a magnitude $R_{ij}$ and a phase $\phi_{ij}$.

$$a_{ij} = b_{ij} * R_{ij} \exp(j\phi_{ij})$$

where the frequencies $\omega_j$ are mutually orthogonal sub-carrier frequencies, $b_{ij}$ is a complex weighting coefficient e.g. a transmitted symbol and $-\pi \leq \phi_{ij} \leq \pi$.

The set of path-sensitive complex values $x_{ij}$ record for each pairing of signal path $p_i$ and frequency $\omega_j$ the effect that signal path $p_i$ has had in changing the originally transmitted data, the coefficient $b_{ij}$.

The transformer $T_i$ in this example is configured to transform a received signal $s_i$ from a time domain to a frequency domain and produce for each of the M multiple orthogonal sub-carriers $\omega_j$ a respective coefficient $a_{ij}$ to create a set $A_i$ of coefficients $\{a_{i1}, a_{i2}, \ldots a_{iM}\}$. The coefficients are provided to processing circuitry 4.

The transform that is performed by the transformer $T_i$ may be, for example, an inverse discrete Fourier transform. A fast Fourier transform algorithm may in some embodiments be used to perform the discrete Fourier transform.

The set of coefficients $\{a_{i1}, a_{i2}, \ldots a_{iM}\}$ are associated with a particular signal path $p_i$. Each of the complex valued coefficients comprises a path-sensitive complex value $x_{ij}$ that includes phase information $\phi_{ij}$ and amplitude information $R_{ij}$. This information is dependent upon the length of the signal path $p_i$. For example, the difference between $\phi_{ij}$ for path $p_1$ and $p_2$ depends upon the difference in position and orientation of the first transmission point $10_1$ and the second transmission point $10_1$ when there is transmitter diversity. For example, the difference between $\phi_{ij}$ for path $p_1$ and $p_2$ depends upon the difference in position and orientation of the first antenna $20_1$ and the second antenna $20_2$ when there is receiver diversity. The information may also be subject to dispersion effects and have some dependence upon the dispersive properties of the signal path $p_i$ at the time the received signal $s_i$ travelled along that path. The set of coefficients $\{a_{i1}, a_{i2}, \ldots a_{iM}\}$ share in common that they have travelled along the same signal path $p_i$ but are each associated with a different frequency $\omega_j$ and therefore potentially different dispersion effects.

The processing circuitry 4 may obtain phase information $\phi_{ij}$ and amplitude information $R_{ij}$ using a known stored value of $b_{ij}$ (e.g. the transmitted symbol) and the determined coefficient $a_{ij}$. For example, each of the determined coefficients $a_{ij}$ may be compared with a known stored value of $b_{ij}$.

The processing circuitry 4, as illustrated by block 6, combines phase information $\phi_{ij}$ and amplitude information $R_{ij}$ for the set of coefficients $\{a_{i1}, a_{i2}, \ldots a_{iM}\}$ to obtain the representative phase information $\phi_i$ and representative amplitude information $R_i$ for the signal path $p_i$. This may compensate for dispersive effects and random noise effects.

The representative phase information $\phi_i$ and representative amplitude information $R_i$ for the signal path $p_i$ may be the average phase information $\phi_i$ and average amplitude information $R_i$ for the signal path $p_i$.

For example, the average amplitude information $R_i$ may be determined using the following equation:

$$R_i = 1 \bigg/ M\left(\sum_{j=1}^{M} R_{ij}\right)$$

The phase information $\phi_{ij}$ that is determined using known stored values of $b_{ij}$ and the determined coefficients $a_{ij}$ relates to phase values that fall within a predetermined range defined by maximum and minimum values. For example, it may be that $-\pi \leq \phi_{ij} \leq \pi$.

In the event that the phase values $\phi_j$ for a particular signal path $p_i$ are situated close to the minimum and maximum boundaries of the range, it may not be possible to determine the average phase information $\phi_i$ correctly by simply calculating the arithmetic mean of the phase values $\phi_j$.

A first method for determining the average phase information $\phi_i$ involves determining phase values $\phi_j$ for a particular signal path $p_i$, and treating each phase value $\phi_j$ as a vector of arbitrary length. The vectors are summed and the angle of the resulting vector provides the average phase information $\phi_i$.

Figure 4:
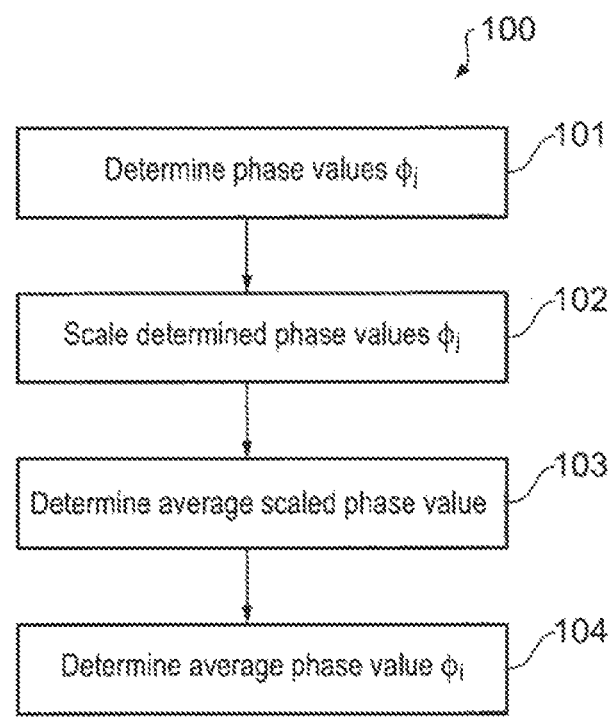
FIG. 4 illustrates a method of determining an average phase value.

A second method 100 for determining the average phase information $\phi_i$ is illustrated in FIG. 4. Advantageously, the second method 100 generally requires less computational power than the first method.

At step 101 of FIG. 4, phase values $\phi_j$ are determined using known stored values of $b_j$ and the determined coefficients $a_j$ for a particular signal path $p_i$.

At step 102, a scaling factor $\phi_s$ is applied to each of the phase values $\phi_j$. In this particular example, the scaling factor $\phi_s$ is subtracted from the phase values $\phi_j$ to produce a plurality of scaled phase values $\phi_j'$:

$$\phi_j' = \phi_j - \phi_s$$

The scaling factor $\phi_s$ may be determined from the phase values $\phi_j$. For example, the scaling factor $\phi_s$ may be set as:

$$\phi_s = \phi_1 - \phi_m$$

where $\phi_m$ is the midpoint of the range for $\phi_{ij}$ and $\phi_1$ is the first phase value that is determined for a particular signal path $p_i$. For example, if $-\pi \leq \phi_j \leq \pi$, then $\phi_m$ is zero, so $\phi_s = \phi_1$.

If the variance of the phase values $\phi_j$ is small and the first phase value $\phi_1$ is located close to either the minimum or maximum boundary of the range, setting the scaling factor $\phi_s$ in accordance with the above equation will produce a plurality of scaled phase values $\phi_j'$ that are located away from the minimum and maximum boundaries of the range.

In some embodiments of the invention, the processing circuitry 4 determines whether the first phase value $\phi_1$ appears to be erroneous before it is used to set the scaling value $\phi_s$. For example, it may do this by calculating the difference between the first phase value $\phi_1$ and some or all of the other phase values $\phi_j$ for that signal path $p_i$. In the event that the average difference is above a threshold, the processing circuitry 4 may determine that the first phase value $\phi_1$ is erroneous. It may perform the same procedure for other phase values $\phi_j$ until an appropriate value is found for use in setting the scaling factor $\phi_s$.

In order to ensure that all of the scaled phase values $\phi_j'$ fall within the range $-\pi \leq \phi_{ij}' \leq \pi$, the scaling factor $\phi_s$ may be applied to the phase values $\phi_j$ using modular arithmetic (also known as modulo arithmetic). In this particular case, type of the modular arithmetic used is "modulo $2\pi$" because the phase values $\phi_{ij}$ are measured in radians and the range is $2\pi$. If the phase values $\phi_{ij}$ were measured in degrees, the type of modular arithmetic used would be "modulo 360".

At step 103, an average scaled phase value $\phi_i'$ is determined by calculating the arithmetic mean of the scaled phase values $\phi_j'$:

$$\phi_i' = \frac{1}{M}\sum_{j=1}^{M} \phi_j'$$

At step 104, the scaling factor $\phi_s$ is applied to the average scaled phase value $\phi'$ to determine an average phase value $\phi^i$. In this particular example, the scaling factor $\phi_s$ is added to the average scaled phase value $\phi_i'$, because the scaling factor $\phi_s$ was subtracted from the phase values $\phi_j$ to produce a plurality of the scaled phase values $\phi_j'$. Therefore:

$$\phi_i = \phi_i' + \phi_s$$

In order to ensure that the average phase value $\phi_i$ falls within the range $-\pi \leq \phi_i \leq \pi$, the scaling factor $\phi_s$ may be applied to the average scaled phase value $\phi_i'$ using modular arithmetic. As indicated above, in this particular case, the type of modular arithmetic used is "modulo $2\pi$" because the phase values $\phi_{ij}$ are measured in radians and the range is $2\pi$.

The combination, for a signal path $p_i$, of the phase information $\phi_{ij}$ and amplitude information $R_{ij}$ for each of the sub-carrier frequencies $\omega_j$ results in a fast and accurate assessment of the phase information $\phi_i$ and amplitude information $R_i$ for the signal path $p_i$ without the need for frequency hopping.

If the transmitted coefficients $b_{ij}$ are the same value b for all values of j then the set of coefficients $a_{i1}, a_{i2}, \ldots a_{iM}\}$ can be averaged and the average compared at block 8 to b to obtain the phase information $\phi_i$ and amplitude information $R_i$ for the signal path $p_i$.

If the transmitted coefficient $b_{ij}$ are different for values of j then the set of coefficients $a_{i1}, a_{i2}, \ldots a_{iM}\}$ are compared at block 8 to the respective transmitted coefficient $b_{ij}$ to obtain a set of path-sensitive complex values $x_{ij}$. The set of path-sensitive complex values $x_{ij}$ are then averaged at block 6 to obtain the average phase information $\phi_i$ and amplitude information $R_i$ for the signal path $p_i$.

The transmitted coefficients $b_{ij}$ may have a value b that is constant for all paths and frequencies, alternatively the transmitted coefficients $b_{ij}$ may have a value $b_i$ that is constant for all frequencies of a particular signal path $p_i$ but changes to a different constant for different signal paths, alternatively the transmitted coefficients $b_{ij}$ may have a value $b_{ij}$ that may be different for different frequencies of a path and/or may be different for different paths.

FIG. 5 schematically illustrates the process 200 for determining a bearing at the apparatus 2. Although the process is illustrated as an algorithm this is merely for illustrative purposes and does not imply that software must be used. The process determines for each signal path $p_i$ the representative phase information $\phi_i$ and amplitude information $R_i$ for the signal path $p_i$ and then uses the representative phase information $\phi_i$ and amplitude information $R_i$ for the signal paths to determine the bearing. The phase information $\phi_i$ and amplitude information $R_i$ for the different signal paths may be determined in parallel if parallel hardware is proved or sequentially. The Figure illustrates the sequential implementation.

At block 202 a received signal $s_i$ is transformed from a time domain to a frequency domain. This produces for each of the M multiple orthogonal sub-carriers $\omega_j$ a respective coefficient $a_{ij}$ to create a set A, of coefficients $\{a_{i1}, a_{i2}, \ldots a_{iM}\}$.

The set of coefficients $\{a_{i1}, a_{i2}, \ldots a_{iM}\}$ are associated with a particular signal path $p_i$. Each of the complex valued coefficients in a set comprise a path-sensitive complex value $x_{ij}$ that includes phase information $\phi_{ij}$ and amplitude information $R_{ij}$. At block 204, phase information $\phi_{ij}$ and amplitude information $R_{ij}$ for the set of coefficients $\{a_{i1}, a_{i2}, \ldots a_{iM}\}$ is combined to obtain the representative phase information $\phi_i$ and representative amplitude information $R_i$ for the signal path $p_i$.

The combination, for a signal path $p_i$, of the phase information $\phi_{ij}$ and amplitude information $R_{ij}$ for each of the sub-carrier frequencies $\omega_j$ results in a fast and accurate assessment of the phase information $\phi_i$ and amplitude information $R_i$ for the signal path $p_i$ without the need for frequency hopping.

Blocks 206 and 208, result in the repetition of blocks 202 and 204 for each of the N signal paths $p_i$.

At block 208, the phase information $\phi_i$ and amplitude information $R_i$ for all or some of the N signal paths is processed to determine the bearing of the apparatus 2.

At block 208, the processing circuitry may renormalize the phase information $\phi_i$ and amplitude information $R_i$ for the signal paths $p_i$. For example, a particular signal path $p_r$ may be designated a reference path and phase information $\phi_r$ and amplitude information $R_r$ for this path are used as a reference for the phase information $\phi_i$ and amplitude information $R_i$ of the other paths.

The processing circuitry 4 may, for example, calculate $\phi_{re} = \phi_i - \phi_r$ for each $i = 1, 2 \ldots N$ and calculate $R_{re} = R_i/R_r$ for each $i = 1, 2 \ldots N$. $\phi_{re}$ represents the phase introduced by signal path $p_i$ relative to signal path $p_r$. $R_{re}$ represents the gain introduced by signal path $p_i$ relative to signal path $p_r$. The set of pairs $\phi_{re}, R_{re}$ for each of the signal paths $p_i$ defines a bearing for the apparatus 2.

The processing circuitry 4 may access a lookup table that has measured reference pairs $\phi_{re}, R_{re}$ for each possible bearing (each possible combination of azimuth angle and elevation angle). A particular set of pairs $\phi_{re}, R_{re}$ may be used to look-up a bearing.

The lookup table may have measured reference pairs $\phi_{re}, R_{re}$ for a limited number of the possible bearings. A correlation may be performed between the measured pair $\phi_{re}, R_{re}$ and the set of reference pairs $\phi_{re}, R_{re}$ to identify a closest matching reference pair $\phi_{re}, R_{re}$. The closest matching reference pair $\phi_{re}, R_{re}$ is then used to look-up a bearing in the lookup table.

The look-up table may be created by calibrating the apparatus 2. The values in the look-up table depend upon the relative displacement of the transmission points $10_1, 10_2 \ldots$ if transmission diversity is used and depend upon the relative displacement of the antennas $20_1, 20_2 \ldots$ if receiver diversity is used.

There are other mechanisms for calculating a bearing. For example, if for example, receiver diversity is used and the antennas $20_1, 20_2 \ldots$ are arranged along three orthogonal axis then the average phase information $\phi_i$ for each path in combination with straightforward trigonometry may be used by the processing circuitry 4 to determine the bearing.

The blocks illustrated in FIG. 4 and/or FIG. 5 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

FIG. 6 illustrates one example of the apparatus 10. The apparatus 10 may, in some embodiments of the invention, be a hand portable electronic device.

In this example, the functionality of the transformers $T_i$ are carried out in hardware by a single transform hardware circuit 40 and the functionality of the processing circuitry 4 is carried out in a processing hardware circuit 42. In some embodiments, the transform hardware circuit and the processing hardware circuit may be provided in a single component whereas in other embodiments they may be provided as separate components. The transform hardware circuit sequentially operates as each of the transformers T. Switching circuitry 44 upstream of the transform hardware circuit 40 provides the received signals $s_i$ in a time division multiplexed manner.

The transform hardware circuit 40 and the switching circuitry 44 may be part of a typical OFDM receiver. Although such a typical OFDM receiver may also have processing hardware circuitry it will not perform the operations of processing circuitry 4 described, for example, in relation to FIGS. 1 and 5 and may not have receiver diversity. Thus in implementations of the invention existing components of an OFDM receiver may be re-used.

Furthermore, it should be appreciated that the functionality of the transformers $T_i$ and/or the processing circuitry 4 could, alternatively be implemented using a processor 50 and a memory 52 storing a computer program 54 as illustrated in FIG. 7.

The processor 50 is configured to read from and write to the memory 52. The processor 50 may also comprise an output interface via which data and/or commands are output by the processor 50 and an input interface via which data and/or commands are input to the processor 50.

The memory 52 stores a computer program 54 comprising computer program instructions that control the operation of the apparatus 2 when loaded into the processor 50. The computer program instructions 54 provide the logic and routines that enables the apparatus 2 to perform one or more of the blocks illustrated in FIG. 4 and FIG. 5. The processor 50 by reading the memory 52 is able to load and execute the computer program 54.

The computer program 54 may arrive at the apparatus 2 via any suitable delivery mechanism 56. The delivery mechanism 56 may be, for example, a computer-readable storage medium, a computer program product, a memory device, a record medium such as a CD-ROM or DVD, an article of manufacture that tangibly embodies the computer program. The delivery mechanism may be a signal configured to reliably transfer the computer program. The apparatus 2 may in some implementations propagate or transmit the computer program 54 as a computer data signal.

Although the memory 52 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Although embodiments of the present invention have been described in the preceding paragraphs with reference to various examples, it should be appreciated that modifications to the examples given can be made without departing from the scope of the invention as claimed. For example, the method of determining an average phase value illustrated in FIG. 4 has been described in relation to an OFDM signal. However, it will be appreciated that the method could be used to determine an average phase value for phase values determined from more than one signal. Also, the signals need not be OFDM signals. For example, they could be Bluetooth signals.

The description of the method of FIG. 4 above describes a scaling factor $\phi_s$ being deducted from the determined phase values $\phi_j$ and then being added to the average scaled phase value $\phi_i'$, in order to determine the average phase value $\phi_i$. Alternatively, the scaling factor $\phi_s$ may be added to the determined phase values $\phi_j$ and then deducted from the average scaled phase value $\phi_i'$ to determine the average phase value $\phi_i$.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
processing circuitry configured to:
determine a plurality of phase values for a plurality of received signal paths, wherein each phase value is calculated from a known transmission symbol and a signal path coefficient;
any one of add and subtract a scaling factor from the determined phase values to produce scaled phase values falling within a predetermined range defined by a maximum value and a minimum value;
determine an average scaled phase value by averaging the scaled phase values; and
determine an average phase value for the plurality of phase values by any one of adding and subtracting the scaling factor to the average scaled phase value.

2. An apparatus as claimed in claim 1, wherein the processing circuitry is configured to apply the scaling factor, using modular arithmetic, to the determined phase values.

3. An apparatus as claimed in claim 1, wherein the processing circuitry is configured to apply the scaling factor, using modular arithmetic, to the average scaled phase value.

4. An apparatus as claimed in claim 1, wherein the processing circuitry is configured to determine a plurality of coefficients from the one or more received signals, and to determine the plurality of phase values by comparing each of the determined coefficients with a stored coefficient.

5. An apparatus as claimed in claim 1, wherein the processing circuitry is configured to determine the scaling factor using one or more of the determined phase values.

6. An apparatus as claimed in claim 1, wherein the processing circuitry is configured to determine a bearing using the average phase value.

7. A method, comprising:
determining a plurality of phase values for a plurality of received signals paths, wherein each phase value is calculated from a known transmission symbol and a signal path coefficient;
any one of adding and subtracting a scaling factor from the determined phase values to produce scaled phase values falling within a predetermined range defined by a maximum value and a minimum value;
determining an average scaled phase value by averaging the scaled phase values; and
determining an average phase value for the plurality of phase values by any one of adding and subtracting the scaling factor to the average scaled phase value.

8. A method as claimed in claim 7, wherein the scaling factor is applied, using modular arithmetic, to the determined phase values.

9. A method as claimed in claim 7, wherein the scaling factor is applied, using modular arithmetic, to the scaled average phase value.

10. A method as claimed in claim 7, further comprising: determining a plurality of coefficients from the one or more received signals, wherein the plurality of phase values is determined by comparing each of the determined coefficients with a stored coefficient.

11. A method as claimed in claim 7, wherein the scaling factor is determined using one or more of the determined phase values.

12. A method as claimed in claim 7, further comprising: determining a bearing using the average phase value.

13. A non-transitory computer readable medium storing a computer program that, when executed by at least one processor, causes the at least one processor to:
determine a plurality of phase values for a plurality of received signal paths, wherein each phase value is calculated from a known transmission symbol and a signal path coefficient;
any one of add and subtract a scaling factor from the determined phase values to produce scaled phase values falling within a predetermined range defined by a maximum value and a minimum value;
determine an average scaled phase value by averaging the scaled phase values; and
determine an average phase value for the plurality of phase values by any one of adding and subtracting the scaling factor to the average scaled phase value.

14. A non-transitory computer readable medium as claimed in claim 13, wherein the scaling factor is applied, using modular arithmetic, to the determined phase values.

15. A non-transitory computer readable medium as claimed in claim 13, wherein the scaling factor is applied, using modular arithmetic, to the scaled average phase value.

16. A non-transitory computer readable medium as claimed in claim 13, wherein the computer program, when executed by at least one processor, further causes the at least one processor to: determine a plurality of coefficients from the one or more received signals, wherein the plurality of phase values is determined by comparing each of the determined coefficients with a stored coefficient.

17. A non-transitory computer readable medium as claimed in claim 13, wherein the scaling factor is determined using one or more of the determined phase values.

18. An apparatus as claimed in claim 1, wherein the scaling factor for a signal path is determined using the first phase value that is determined for the signal path and the midpoint of the range of determined phases.

19. A method as claimed in claim 7, wherein the scaling factor for a signal path is determined using the first phase value that is determined for the signal path and the midpoint of the range of determined phases.

20. A non-transitory computer readable medium as claimed in claim 13, wherein the scaling factor for a signal path is determined using the first phase value that is determined for the signal path and the midpoint of the range of determined phases.

* * * * *